UNITED STATES PATENT OFFICE.

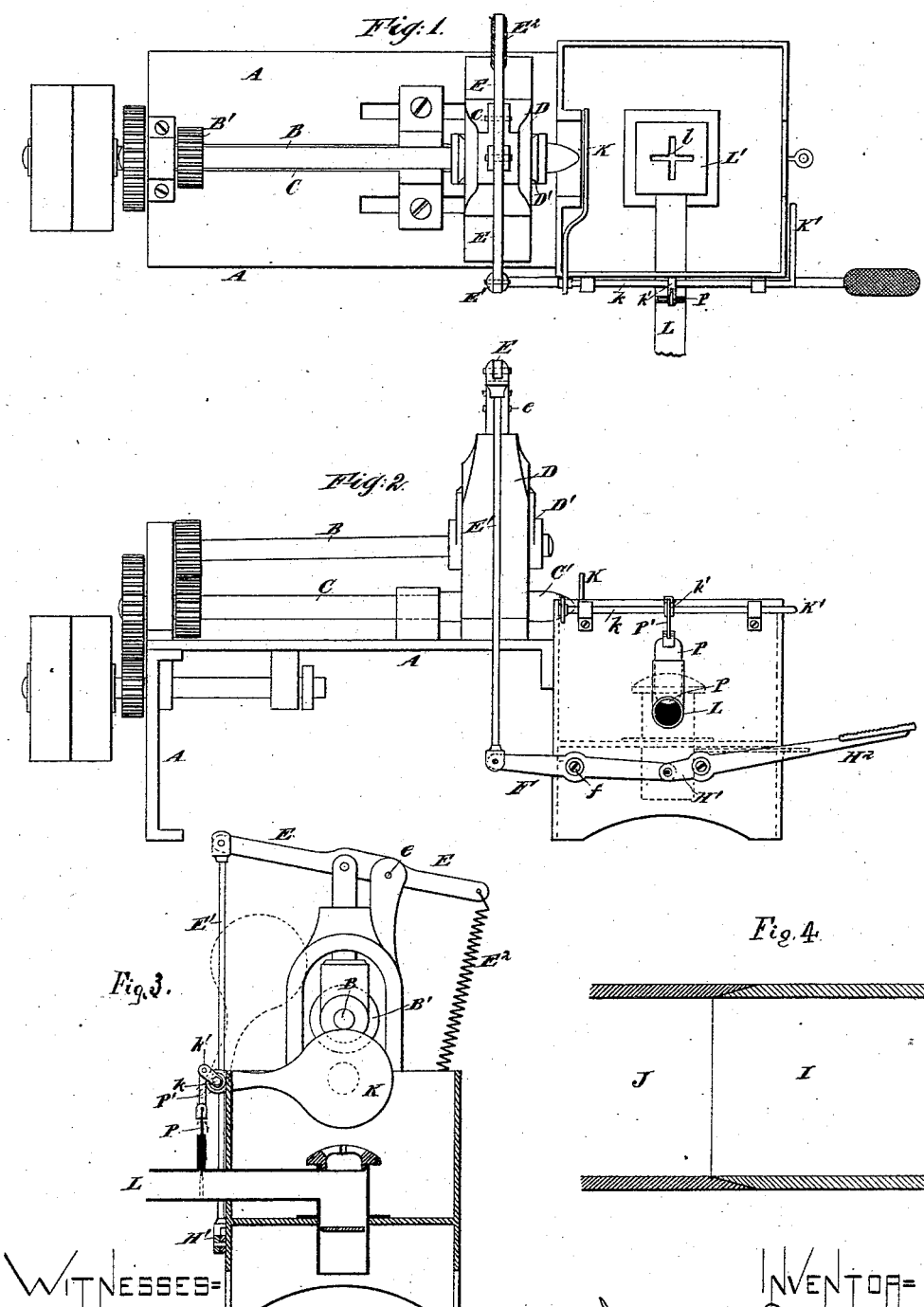

JAMES SADLER, OF NEW YORK, N. Y.

APPARATUS FOR WELDING TUBES.

SPECIFICATION forming part of Letters Patent No. 305,239, dated September 16, 1884.

Application filed October 8, 1883. (No model.)

*To all whom it may concern:*

Be it known that I, JAMES SADLER, of New York city, in the county and State of New York, have invented certain new and useful Improvements in Apparatus for Welding Tubes, of which the following is a specification.

The general construction and mode of operation corresponds with that set forth in the patent to me dated May 3, 1881, No. 240,848. I have devised important improvements. The shield which stands in the small space intervening between the fire and the welding-rolls is mounted on a shaft provided with a convenient handle, so that one man can work the whole. The tuyere is changeable, so that by a simple operation the amount of wind can be graduated in welding tubes of different sizes or thicknesses, or with the use of different fuels.

In what I esteem the most complete mode of carrying out the invention, the wind-valve is connected to the same shaft which operates the shield, so that the removal of the shield to allow the tube to be thrust endwise into the pulleys and welded shuts off the wind entirely, and a replacing of the shield will let on the wind again.

The accompanying drawings form a part of this specification, and represent what I consider the best means of carrying out the invention.

Figure 1 is a plan view; Fig. 2, an end elevation, and Fig. 3 a cross-section in Figs. 1 and 2. These drawings show the novel parts, with so much of the ordinary parts as is necessary to indicate their relations thereto. Fig. 4 is a section of a tube-joint as prepared for the welding. It is shown on a larger scale than the other figures.

Similar letters of reference indicate like parts in all the figures where they occur.

A is the fixed frame-work; B, the upper shaft, carrying the wheel or roller B'; C, the lower shaft, carrying the roller C'; D, the housing, and D' the slide. The wheels B' and C' are geared together, and may be driven by gearing from a driving-shaft receiving motion through a pulley and belt from any convenient power.

E is the lever which depresses the upper roller and effects the welding. It turns on the fixed center $e$, and is subject to the force of a spring, $E^2$, at one end, and to a rod, E', at the other end. This rod E' connects with a lever, F, turning on the fixed center $f$, which is operated by the short arm H' of a treadle, $H^2$.

The fire is marked G, and may be an open fire of bituminous coal or other suitable fuel.

The lengths of tube to be welded are marked I and J, I being a long tube and J a short length of the same, or of different iron or steel which is to be welded thereon. The ends are previously scarfed by the means set forth in my previous patent, or otherwise. The surfaces, if freshly cut, may be applied together without flux, and on taking a proper heat and instantly subjecting the joint to the rapid action of the rollers a good weld will result.

K is what I term a "shield." It may be a flat disk, of cast or wrought iron, of sufficient size and strength to defend the rollers against the heat of the closely-adjacent fire, and also to serve as an abutment against which the end of the short tube J may be pressed by force applied to the long tube I, to close the beveled joint tightly together when the proper heat is obtained and the tube is about to be transferred into the rolls. The shield K is fixed on a shaft, $k$, operated by a crank or handle, K'. When the temperature of the lengths I J is sufficiently raised, the tube is first thrust against the shield K with gentle force, then withdrawn a little, and the handle K' operated to lift the shield K. Then the tube is thrust forward upon the lower roll, C'. Then the treadle $H^2$ is operated, bringing down the upper roll, B', and both rolls B' and C' being constantly turned, the tube is rotated and subjected to a gentle pressure a few times, and the weld is complete. On liberating the treadle, withdrawing the tube, and turning the handle K', and consequently the shield K, back to its original position, where the shield is interposed between the fire and the rollers, another tube may be introduced and the work proceed as before.

L is the tube through which the wind is received from a fan or other suitable blower, (not represented,) to urge the fire. L' is a removable or exchangeable head, which serves as a tuyere. A number of these removable or exchangeable heads, L', are provided, each having an orifice, l, of a different size from the others. The form of the orifice is preferably a Greek cross. To change the amount of wind, it is simply necessary to remove the cap or tuyere L' and substitute another with a larger or smaller orifice, l.

P is the slide, adapted to extend across the pipe L and cut off the wind altogether when required. It is connected by a link, P', to an arm, k', on the shaft k. When the operator turns the shaft k by means of the handle K' to lift the shield K, the same movement depresses the arm k', and with it the slide P, and cuts off the wind from the fire. When the rolling is completed and the tube removed, the turning of the handle K' back to its first position not only restores the shield K to its effective position, but also withdraws the slide P and allows the wind to again urge the fire.

The hinged shield K, with its operating means k K', allows a single attendant to operate the entire apparatus. When the two parts of the tube have been raised to the proper heat and gently stuck together by an end-thrust, which has the effect to upset or thicken the parts immediately adjacent to the joint, in addition to inducing a cohesion of the joint, he operates the tube in the right hand, the handle K' in the left hand, and puts one foot on the treadle H². It is with tubes of ordinary size easy to lift the shield with the left hand, thrust forward the tube with the right, and then depress the treadle with the foot and hold it depressed for the proper period, allowing the tube to turn freely in the hand, or in any suitable rest (not shown) which has been provided, in line with the lower shaft, C.

Modifications may be made in the forms and proportions. Parts of the invention may be used without the whole. I can, if desired, dispense with the intermediate lever, F, and operate the rod E' by direct connection to a properly-located treadle-lever; but I prefer the construction shown.

I claim as my invention—

1. In a tube-welding apparatus, the hinged shield K, shaft k, and operating-lever K', in combination with the rolls B' C' and their operating mechanism, arranged to serve as herein specified.

2. In a tube-welding apparatus, the hinged shield K and wind valve or slide P, in combination with a single operating-handle, K', the arm k', and suitable connections to each, arranged to serve as and for the purposes herein specified.

In testimony whereof I have hereunto set my hand, at New York city, this 10th day of September, 1883, in the presence of two subscribing witnesses.

JAMES SADLER.

Witnesses:
CHARLES R. SEARLE,
M. F. BOYLE.